Sept. 6, 1960 B. CARLIN 2,951,975
ULTRASONIC SOLDERING EQUIPMENT
Filed May 1, 1956

INVENTOR.
BENSON CARLIN
BY
Kenyon + Kenyon
ATTORNEYS

United States Patent Office 2,951,975
Patented Sept. 6, 1960

2,951,975

ULTRASONIC SOLDERING EQUIPMENT

Benson Carlin, Fair Lawn, N.J., assignor to Alcar Instruments, Inc., Little Ferry, N.J., a corporation of New Jersey Filed May 1, 1956, Ser. No. 581,922

4 Claims. (Cl. 318—118)

This application is a continuation-in-part of the pending application Serial No. 499,025, filed April 4, 1955 and now abandoned.

The present invention relates generally to the energization of ultrasonic transducers and more particularly to improved circuit-arrangements for efficiently driving ultrasonic soldering transducers.

It is known to make use of transducers to vibrate heated soldering irons at an ultrasonic rate for the purpose of soldering aluminum or similar material without flux. Ultrasonic transducers may also be incorporated in cutting and mixing tools and in a variety of other applications. Such transducers are driven by ultrasonic generators and may be constituted by magnetostrictive or piezo-electric elements.

Heretofore it has been the practice to drive such elements by means of sinusoidal oscillators energized by high-voltage, direct-current supplies. Since the production of sine waves entails a large number of components and the direct-current supply requires the use of rectifiers and filters, conventional drive units for transducers are relatively cumbersome and elaborate in design. Moreover, such conventional units have been found to give rise to a fairly small output of ultrasonic energy as compared to the amount of electrical input power.

In view of the foregoing, it is the primary object of this invention to provide an improved ultrasonic drive generator of high efficiency and simplified design.

More specifically, it is an object of this invention to provide a drive generator for an ultrasonic transducer, which generator is adapted to shock excite the transducer by means of non-sinusoidal wave energy. A significant feature of the invention resides in the fact that with shock excitation of the transducer the ultrasonic output is large relative to the electrical input, as compared to prior art arrangements.

Also an object of the invention is to provide a drive generator for a transducer, which generator may be energized and biased by an alternating current source or an unfiltered rectified supply, thereby reducing the number of components required and affording a more compact unit.

A further object of the invention is to provide a drive generator for an ultrasonic soldering iron which may be manufactured and sold at relatively low cost.

Figure 1:
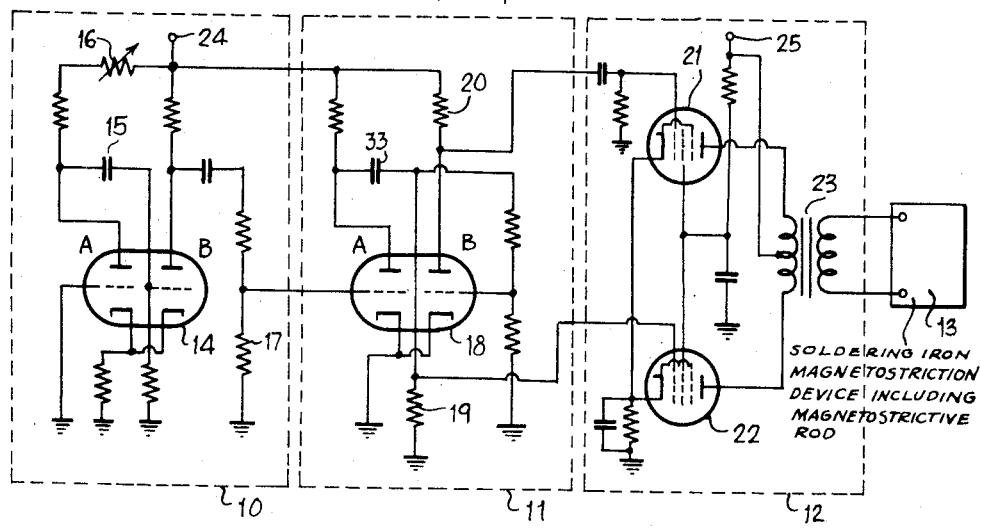
Figure 2:
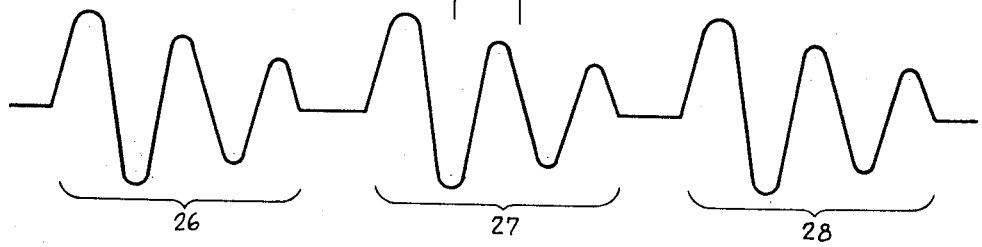
Figure 3:
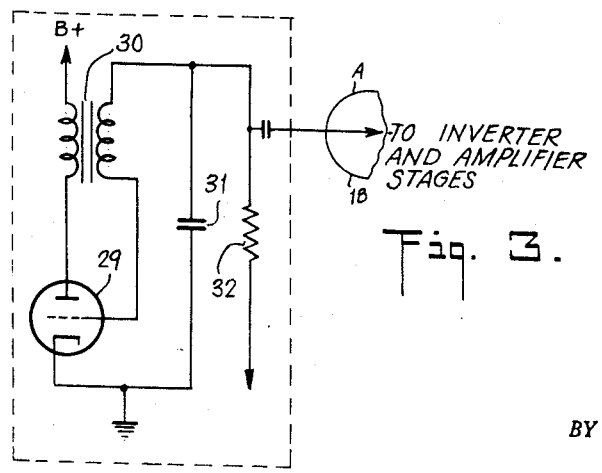

For a better understanding of the invention, as well as other objects and further features thereof, reference is made to the following detailed description to be read in connection with the accompanying drawing, wherein Fig. 1 is a schematic circuit diagram of one preferred embodiment of a driver generator in accordance with the invention;

Fig. 2 is a graph showing the wave form of energy produced by the circuit in Fig. 1; and Fig. 3 is a schematic circuit-diagram of a second preferred embodiment of the invention.

Referring now to the drawing, and more particularly to Fig. 1, there is shown an ultrasonic drive generator constituted by a square wave generator stage 10, a phase-inverter stage 11, and a push-pull power amplifier stage 12. The output of the amplifier is fed to the coil of a transducer head represented by block 13, which is preferably in the form of a magnetostrictive element. The transducer may be incorporated within a soldering iron in the usual manner. Thus, in the case of a magnetostriction device, the heating element may be contained within a hollow magnetostrictive rod.

The square wave generator 10 stage includes a dual triode tube 14 having sections A and B connected in a multivibrator circuit. The anode of triode section A is connected to the grid of section B via a condenser 15. The frequency of operation is controlled by a variable resistor 16 in the anode circuit of section A. The square wave generator determines the frequency of oscillation and is completely independent of the transducer 13, thereby making it possible to drive the transducer at any frequency, without regard to the resonance frequency of the transducer. This permits the use of a wide variety of interchangeable tools without the necessity of making the operation at exactly the same frequency. For example, tools employed in soldering, cutting or mixing may be inserted in the same coil and driven by the same generator at different frequencies or at the same frequency. However, for optimum efficiency of operation, it is desirable that the operating frequency of operation be tuned to the resonance frequency of the transducer.

The output of the square wave generator is developed across resistor 17 in the anode circuit of tube section B and is applied to the grid of section A of a dual triode tube 18 in the inverter stage 11. The anode of section A of tube 18 is coupled via condenser 33 to the cathode circuit of section B whereby the voltage developed across cathode resistor 19 is in phase opposition with the voltage developed across anode resistor 20. These phase displaced voltages are applied to the grid circuits of pentodes 21 and 22 in the push-pull amplifier stage 12 whose output is applied through transformer 23 to the transducer 13.

Anode voltage for the sections A and B of tubes 14 and 18, respectively, is applied at terminal 24 common thereto, whereas anode voltage for tubes 21 and 22 is applied to terminal 25 connected to the centertap of transformer 23. This anode voltage may be constituted by raw alternating current, in which event the tubes will operate in the alternate positive halves of the A.-C. cycle. Alternatively, the anode voltage may be derived from an unfiltered rectified high voltage source. In any event, the oscillations produced by the drive generator will be modulated either by the frequency of the alternating current or by the ripple frequency of the unfiltered supply.

The square wave energy produced in multivibrator stage 10 is somewhat distorted in amplifier stage 12 and appears as a pseudo-sine wave. However, the exact shape of the pulsating energy is not significant, as long as it deviates materially from the sinusoidal and is in effect constituted by relatively steep voltage surges.

The use of non-sinusoidal waves, as above described, offers the advantage that a greater proportional amount of effective ultrasonic energy may be produced by the same drive unit, as compared to the use of sinusoidal waves. The use of non-sinusoidal waves or a wave form which effectively turns the energy on and off abruptly tends to shock excite the magnetostriction transducer head, causing it to ring or oscillate at its natural frequency until damped out by the losses in the head.

It is possible to employ a square wave at a frequency such as 27,000 cycles per second at which the head itself is resonant. On the other hand, it is also feasible to use the square wave at a much lower frequency such as 60 cycles. Since the change from one condition to the other in the square wave is extremely rapid, the wave is rich in harmonic components and it will tend to excite the head in a manner such that it will ring at its natural frequency until damped out by the losses in the head. Inasmuch as these heads are high-Q devices, they will tend to oscillate for some time. This type of unit obviates the need for a tunable oscillator and produces exponentially decaying wave trains. Thus, as shown in Fig. 2, the damped wave is constituted by periodic trains 26, 27 and 28 of pulse energy, the successive pulses being of diminishing amplitude.

In lieu of the multivibrator oscillator stage shown in Fig. 1 for producing a continuous square wave, this stage may be replaced by a pulse generator, such as is illustrated in Fig. 3 yielding periodic voltage pulses or other forms of interrupted energy. The pulse generator comprises a triode 29 whose anode circuit is regeneratively coupled to the grid circuit through a transformer 30, the circuit being periodically blocked by means of a condenser 31—resistor 32 combination. A drive circuit employing this pulse generator in the oscillator stage will also shock-excite the transducer to produce damped waves of the type shown in Fig. 2.

While there have been illustrated preferred embodiments of the invention, it will be obvious that many changes and modifications may be made therein without departing from the essential principles of the invention. It is intended, therefore, in the appended claims to cover all such modifications and changes as fall within the true spirit of the invention.

What is claimed is:

1. Ultrasonic soldering apparatus for generating ultrasonic energy with an output which is relatively high for a given electrical input comprising a magnetostriction transducer adapted to drive a soldering tool and provided with a magnetostrictive rod and an operating coil therefor, said transducer having a predetermined natural frequency, a generator for driving said transducer including a square wave multivibrator, a push-pull amplifier and a phase inverter coupling said multivibrator to said amplifier to apply said square wave thereto in phase opposition, and means coupling said amplifier to said coil to shock-excite said transducer at its natural frequency to produce uninhibited periodic trains of damped waves.

2. Apparatus as set forth in claim 1 wherein said multivibrator is adjusted to operate at a frequency corresponding to the natural frequency of said transducer.

3. Apparatus as set forth in claim 1 wherein said multivibrator is adjusted to operate at a frequency which is relatively low with respect to the natural frequency of said transducer.

4. Apparatus as set forth in claim 1, wherein said multivibrator, said inverter and said amplifier are energized from an alternating current source whereby the wave produced thereby is modulated accordingly.

References Cited in the file of this patent

UNITED STATES PATENTS

| | | |
|---|---|---|
| 2,266,668 | Tubbs | Dec. 16, 1941 |
| 2,418,112 | De Rosa | Apr. 1, 1947 |
| 2,429,844 | Rothman et al. | Oct. 28, 1947 |
| 2,553,251 | Gutterman | May 15, 1951 |
| 2,562,341 | Starr | July 31, 1951 |
| 2,651,012 | Van Valkenburg et al. | Sept. 1, 1953 |
| 2,714,186 | Henrich | July 26, 1955 |

OTHER REFERENCES

Basic Electronics; vol. 2, pages 2–82, by Van Valkenburgh, Nooger, and Neville, Inc., John F. Rider Publisher, Inc.